US012063549B2

(12) United States Patent
Jang et al.

(10) Patent No.: US 12,063,549 B2
(45) Date of Patent: *Aug. 13, 2024

(54) SCALING NETWORK CAPABILITY USING BASEBAND UNIT POOLING IN FIFTH GENERATION NETWORKS AND BEYOND

(71) Applicant: AT&T Intellectual Property I, L.P., Atlanta, GA (US)

(72) Inventors: Minsung Jang, Basking Ridge, NJ (US); Aleksandr Zelezniak, Morganville, NJ (US); Kaustubh Joshi, Short Hills, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,175

(22) Filed: Jan. 17, 2023

(65) Prior Publication Data
US 2023/0292180 A1    Sep. 14, 2023

Related U.S. Application Data

(63) Continuation of application No. 17/098,619, filed on Nov. 16, 2020, now Pat. No. 11,582,642.

(51) Int. Cl.
*H04W 28/086* (2023.01)
*H04W 28/02* (2009.01)
(Continued)

(52) U.S. Cl.
CPC ... *H04W 28/0861* (2023.05); *H04W 28/0263* (2013.01); *H04W 28/12* (2013.01); *H04W 80/02* (2013.01)

(58) Field of Classification Search
CPC ............. H04W 28/0861; H04W 80/02; H04W 28/0263; H04W 28/12
See application file for complete search history.

(56) References Cited

U.S. PATENT DOCUMENTS 11,095,559 B1 *  8/2021  Garvia ................. H04L 45/124
11,304,109 B1 *  4/2022  Potharaju ............. H04W 76/15
(Continued)

FOREIGN PATENT DOCUMENTS

CN    110944337 A  *  3/2020  ......... G06F 9/45558
EP    3 618 518 A1    3/2020
(Continued)

OTHER PUBLICATIONS

Non-Final Office Action received for U.S. Appl. No. 17/104,458 dated Mar. 21, 2022, 43 pages.
(Continued)

*Primary Examiner* — Mehmood B. Khan
(74) *Attorney, Agent, or Firm* — Guntin & Gust, PLC; John G. Rauch

(57) ABSTRACT

The disclosed technology is directed towards load balancing baseband units in a communications network. A baseband physical layer 1 unit's functions are disaggregated into Layer 1 (L1) distributed units and radio units, instead of deploying full-fledged baseband units at a service' provider's service areas (cells). A load balancer scales up the number of active distributed units based on increased actual demand, and scales down the active distributed units based on decreased demand. The L1 distributed units and radio units can be software-defined network functions, and need not be collocated, whereby the distributed units can be in the cloud or hub remotely located relative to the radio units deployed at the service areas. Examples of load balancing can be load balancing of transmitted data per carrier, per subcarrier, per user equipment, per transmission time interval (TTI/slot), per bearer, or per channel.

20 Claims, 12 Drawing Sheets

(51) Int. Cl.
*H04W 28/12* (2009.01)
*H04W 80/02* (2009.01)

(56) References Cited

U.S. PATENT DOCUMENTS

| | | | | |
|---|---|---|---|---|
| 11,490,274 | B2* | 11/2022 | Khanfouci | H04M 15/8016 |
| 11,582,642 | B2* | 2/2023 | Jang | H04W 28/0861 |
| 2018/0270869 | A1 | 9/2018 | Tsai | |
| 2020/0107307 | A1* | 4/2020 | Nammi | H04L 5/0051 |
| 2020/0145154 | A1* | 5/2020 | Black | H04L 5/0035 |
| 2020/0196220 | A1 | 6/2020 | Centonza et al. | |
| 2020/0274656 | A1 | 8/2020 | Gordaychik | |
| 2020/0351955 | A1 | 11/2020 | Jeon et al. | |
| 2021/0219182 | A1* | 7/2021 | Yuan | H04W 28/0983 |
| 2021/0266764 | A1* | 8/2021 | Khanfouci | H04M 15/8016 |
| 2022/0159510 | A1 | 5/2022 | Jang et al. | |
| 2022/0167418 | A1 | 5/2022 | Zelezniak et al. | |

FOREIGN PATENT DOCUMENTS

| | | | | |
|---|---|---|---|---|
| EP | 3618518 A1 * | 3/2020 | | H04M 15/8016 |
| EP | 3 879 886 A1 | 9/2021 | | |
| WO | 2020/096860 A1 | 5/2020 | | |
| WO | WO-2020096860 A1 * | 5/2020 | | H04B 7/024 |
| WO | 2020/144637 A1 | 7/2020 | | |
| WO | WO-2020144637 A1 * | 7/2020 | | H04J 13/18 |
| WO | 2021/135416 A1 | 7/2021 | | |
| WO | WO-2021135416 A1 * | 7/2021 | | H04L 45/245 |
| WO | 2022/087603 A1 | 4/2022 | | |
| WO | WO-2022087603 A1 * | 4/2022 | | |

OTHER PUBLICATIONS

Jung, et al., "Pooling of Baseband Units in Fifth Generation Networks and Beyond", U.S. Appl. No. 17/653,545, filed Mar. 4, 2022, 44 pages.

Zelezniak, et al., "Sharing of Baseband Units in Fifth Generation Networks and Beyond", U.S. Appl. No. 17/681,511, filed Feb. 25, 2022, 43 pages.

Zelezniak, et al., "Baseband Unit Pooling Using Shared Scheduler", U.S. Appl. No. 17/809,363, filed Jun. 28, 2022, 42 pages.

Notice of Allowance received for U.S. Appl. No. 17/098,619 dated Oct. 18, 2022, 32 pages.

Notice of Allowance received for U.S. Appl. No. 17/104,458 dated Aug. 10, 2022, 39 pages.

Notice of Allowance received for U.S. Appl. No. 17/104,458 dated Sep. 1, 2022, 17 pages.

Notice of Allowance received for U.S. Appl. No. 17/104,458 dated Nov. 23, 2022, 16 pages.

U.S. Appl. No. 17/098,619, filed Nov. 16, 2020.

* cited by examiner

SCALING NETWORK CAPABILITY USING BASEBAND UNIT POOLING IN FIFTH GENERATION NETWORKS AND BEYOND

RELATED APPLICATION

The subject patent application is a continuation of, and claims priority to, U.S. patent application Ser. No. 17/098,619, filed Nov. 16, 2020, and entitled "SCALING NETWORK CAPABILITY USING BASEBAND UNIT POOLING IN FIFTH GENERATION NETWORKS AND BEYOND," the entirety of which priority application is hereby incorporated by reference herein.

TECHNICAL FIELD

The subject application relates to wireless communications systems in general, and more particularly to New Radio (NR) including fifth generation (5G) cellular wireless communications systems and/or other next generation networks.

BACKGROUND

In 5G (fifth generation) cellular wireless communications systems, the cost of service deployment can be significant because part of 5G uses much higher frequencies than the other wireless technologies such as LTE. The signals using these frequencies allow network service providers to provide significantly faster speeds and larger bandwidth to the customers relative to previous generation technologies. The higher frequency signals, however, travel considerably shorter distances, dissipate much more easily, and penetrate obstacles less than previous generation technologies.

As a result, to provide generally the same service coverage, a 5G service has to have a far-denser deployment than other existing wireless technologies. This causes a substantial burden on any 5G service provider in terms of capital and operational costs.

In general, in the current deployment model, the service providers have to deploy full-fledged baseband units at its service areas, even when the demand is relatively very low; for example, service providers need to overprovision baseband units in anticipation of growing demand. This results in significant monetary investment for what tends to be unnecessary and underutilized baseband units at the initial stage of deployment. Indeed, because of overprovisioning, there is a high likelihood of having idle baseband units that basically do nothing but waste electricity. As the 5G service mandates high-density deployment, this results in a sharp rise in the operational cost of the service providers, particularly the cost of energy.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
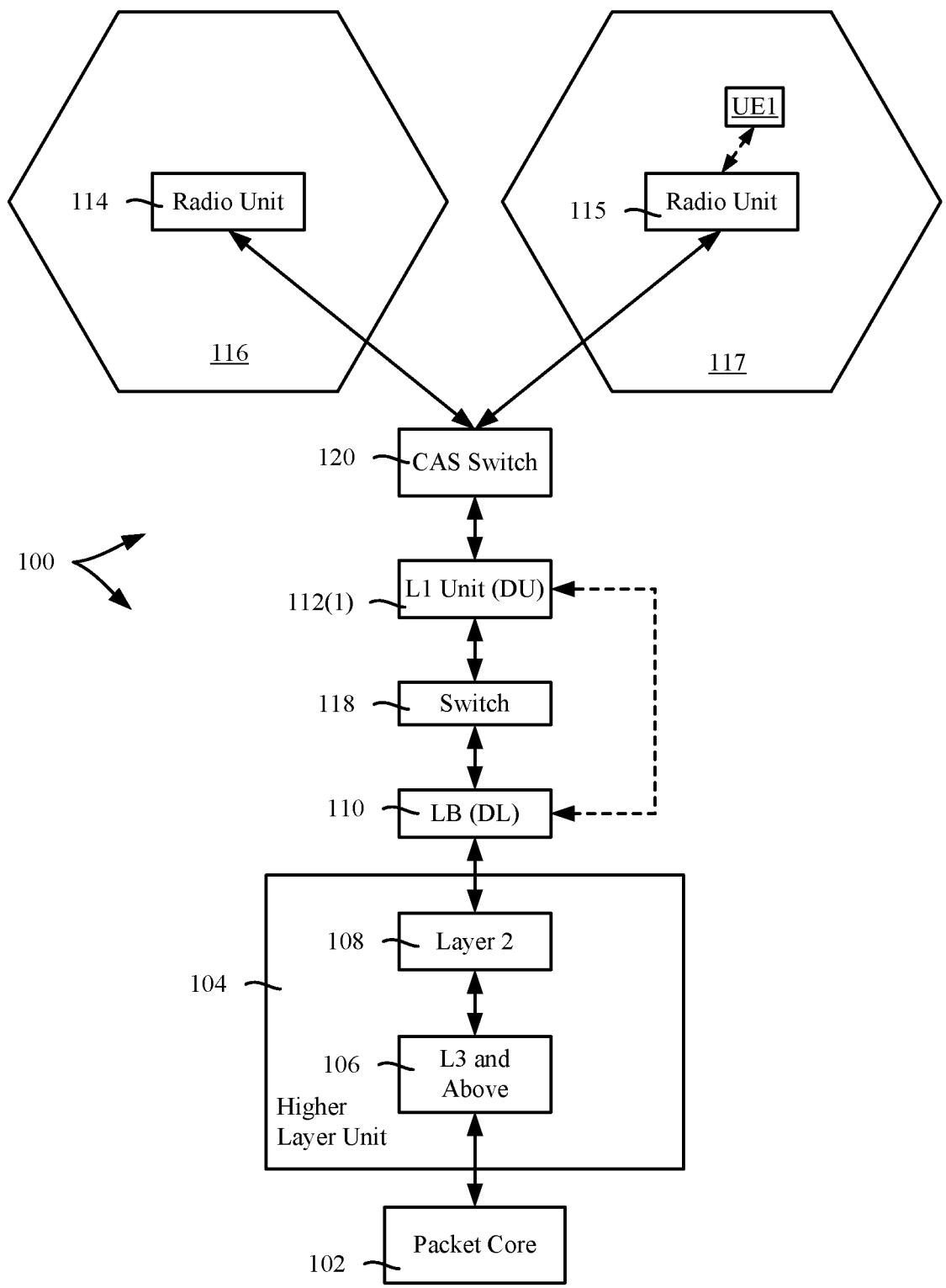
FIG. 1 is a block diagram illustrating an example network communication system in which a single physical layer 1 distributed unit, disaggregated from physical layer 1 radio units, is configured to handle data communications to and from the radio units, in accordance with various aspects and embodiments of the subject disclosure.

The technology described herein is generally directed towards functionally disaggregating baseband units into High physical layer baseband unit functions and Low physical layer baseband unit functions, and limiting deployment of the baseband unit functions to those currently in need by scaling the baseband unit functions based on current, actual demand. This results in eliminating the need to deploy full-fledged baseband units, which are not capable of scaling network capability to match the current actual demand. Note that to distinguish a full-fledged baseband unit from one with disaggregated functions, in general the term "distributed unit" is used herein for High physical layer unit functions, and the term "radio unit" is used for the Low physical layer unit functions. Note that this is not the same as distributed units at higher layers (L2 and above).

Thus, via the disaggregation, distinct functional units are provided, which in one implementation comprise an L1 (physical layer/layer 1) radio unit to process L1 information to and from user equipment, and a High L1 distributed unit to process L1 information received from or being sent to Layer 2 applications and the like, including media access control/MAC data and above. The number of deployed High units can be dynamically changed based on demand.

The High units (e.g., distributed units) and L1 units (e.g., radio units) are not required to be located at the same location. Thus, in one implementation, the distributed units are software-defined network functions, e.g., located in the cloud or a hub relatively far from the radio units, which are generally located at the service areas/cell sites. Instead of deploying full-fledged baseband units for every single service area, a minimum number of L1 and High units can be deployed to meet the current demand, covering multiple service areas. These software-defined network functions can be scaled up or down based on the current demand.

In one aspect, the technology provides a component for bridging two units, comprising a load balancer for downlink communications, which connects higher layer applications to the distributed units, seamlessly scales the L1 processing capability, and can distribute workload from the distributed unit(s) to the radio unit(s) based on various granularities such as carriers, subcarrier, transmission time intervals (TTIs), frame, subframe, slot, user equipment (UE) devices, bearers, or channels. When the demand grows, the load balancer scales up the network capability accordingly by creating one or more new distributed units to deal with the additional demand, and then scaling down the number of distributed units as demand decreases. This approach can help the service providers reduce the operational cost by dynamically activating (creating) or deactivating (purging) distributed units based on changing demand over time. For example, the load balancer can create more distributed units in response to increased daytime demand, and reduce the number of distributed units to reflect a reduced nighttime demand.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

Figure 2:
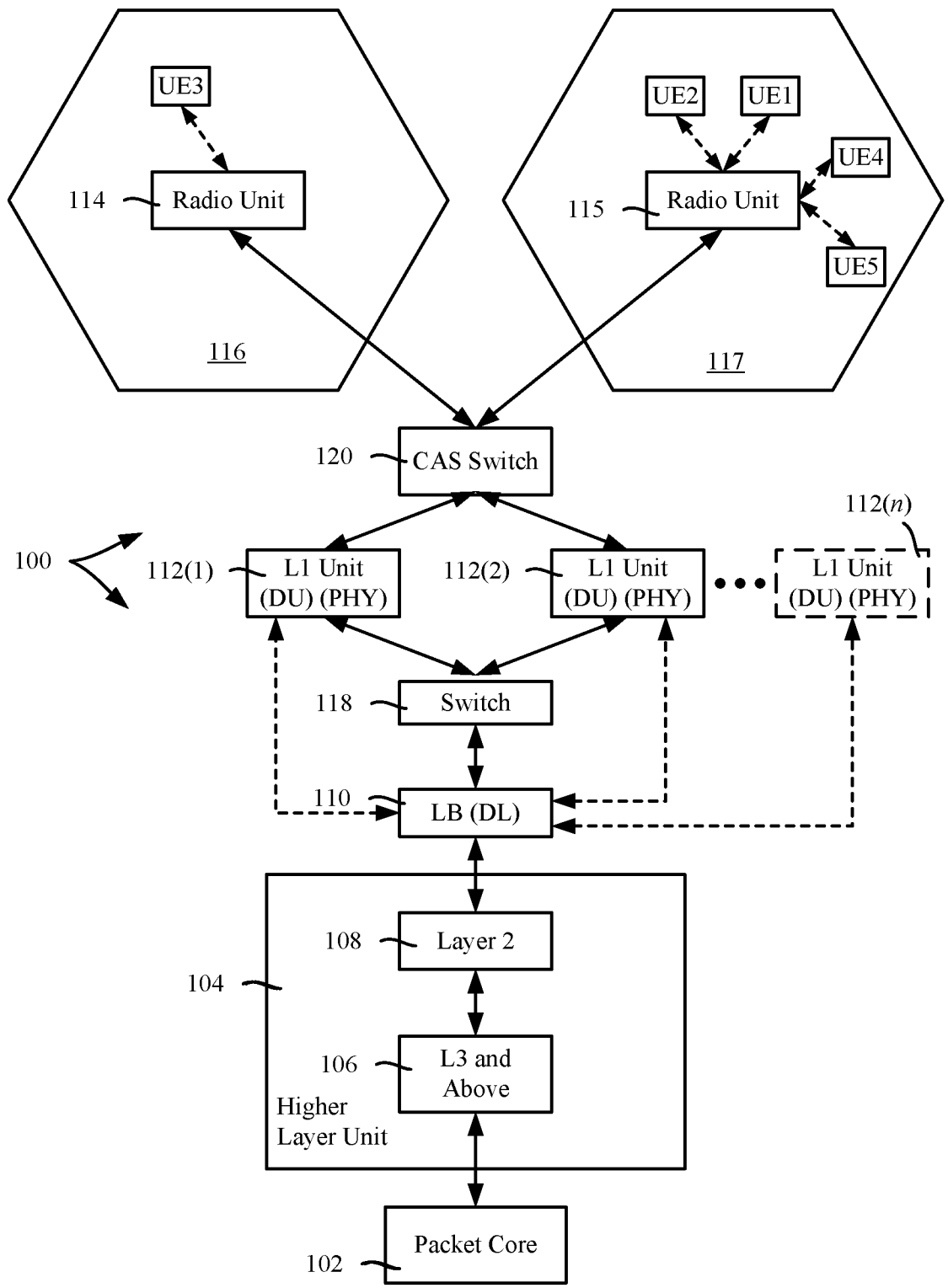
FIG. 2 is a block diagram illustrating an example network communication system in which a load balancer activates two or more physical layer 1 distributed units, based on distributed unit utilization corresponding to increased demand, to handle data communications to and from radio units, in accordance with various aspects and embodiments of the subject disclosure.

As shown in the example system 100 of FIGS. 1 and 2, a packet core 102 (e.g., providing software-based network functions/services) is coupled to a higher layer unit 104, such as including higher layer components 106 (L3 and above) and Layer 2 (L2, e.g. including the Media Access Control, or MAC) component(s) 108. In turn, the higher layer unit 104 is coupled to (or incorporates) a load balancer 110 for downlink communications, which activates (creates) and deactivates (purges) distributed units 112(1)-112(n) based on load utilization demand as described herein. As can be seen, L1 processing is split (split option 7.2x in the downlink according to the Open Radio Access Networks, or ORAN alliance) between the distributed unit(s) 112(1)-112(n) and radio units 114 and 115, which are located in service areas/cell sites 116 and 117, respectively.

Note that the ORAN alliance defines its own specifications leveraging the cloud architecture with respect to radio network services. ORAN's split option 7.2x provides for dividing a baseband into two deployment units, and also defines a Radio Unit (RU) being deployed as a point of transmitting and receiving signals to communicate with user's devices at service areas (cells). In the ORAN specification, because CUs and DUs do not need to be collocated with RUs, the service providers can place DUs and CUs remotely relative to one another. However, this ORAN approach has a one-to-one fixed mapping of a full-fledged baseband unit for each service area (cell), because of the computing-intensive tasks that require substantial hardware resources and highly-optimized software algorithms due to processing Layer 1's strict timing constraints.

Returning to FIG. 1, in this example a single user equipment device (UE1) is coupled to the radio unit 115. In contrast, in FIG. 2, a larger number of user equipment devices (UE1-UE5) are actively communicating, shown as UE1, UE2, UE4 and UE5 via the radio unit 115, and UE3 via radio unit 114.

As represented by the increase in user equipment from FIG. 1 to FIG. 2, as demand increases, the load balancer 110 scales up the number of distributed units, e.g., from a single distributed unit 112(1) in FIG. 1 to two distributed units 112(1) and 112(2) in FIG. 2. As described herein, any practical number of distributed units can be activated from a pool of distributed units 112(1)-112(n) as needed. Further, when not needed, one or more distributed units 112(1)-112(n) can be deactivated; e.g., the system 100 can go from multiple distributed units as in FIG. 2 to a single distributed unit 112(1) as in FIG. 1. In general, at least one distributed unit remains active, although it is feasible to have zero active distributed units if one can be activated sufficiently rapidly as needed to serve a user.

In the examples of FIGS. 1 and 2, the data to and from the user equipment devices (UE1-UE5) is communicated through a switch 118. As will be understood, the load balancer 110, in conjunction with the switch 118, directs the control message data and downlink user data traffic to one of the distributed units, thereby facilitating load balancing among the active distributed units when more than one distributed unit is active. The distributed unit knows the radio unit address, whereby a CAS (cloud) switch 120 sends the traffic to the correct radio unit 114 or 115 as further described herein.

It should be noted that an independent load balancer component 110 is shown in FIGS. 1 and 2; however this is only one possible implementation. In alternative implementations shown in FIGS. 3A-3C, a load balancer 310A can be incorporated into a higher layer unit 304 (FIG. 3A), which, as shown in the alternative of FIG. 3B, can be implemented as a load balancer 310B in the Layer 2 component 308. FIG. 3C shows another alternative in which a load balancer 310C is incorporated into the switch 318C (corresponding to the switch 118 of FIGS. 1 and 2). It is also feasible to have a load balancer's different functions separated among more than one component.

Figure 4:
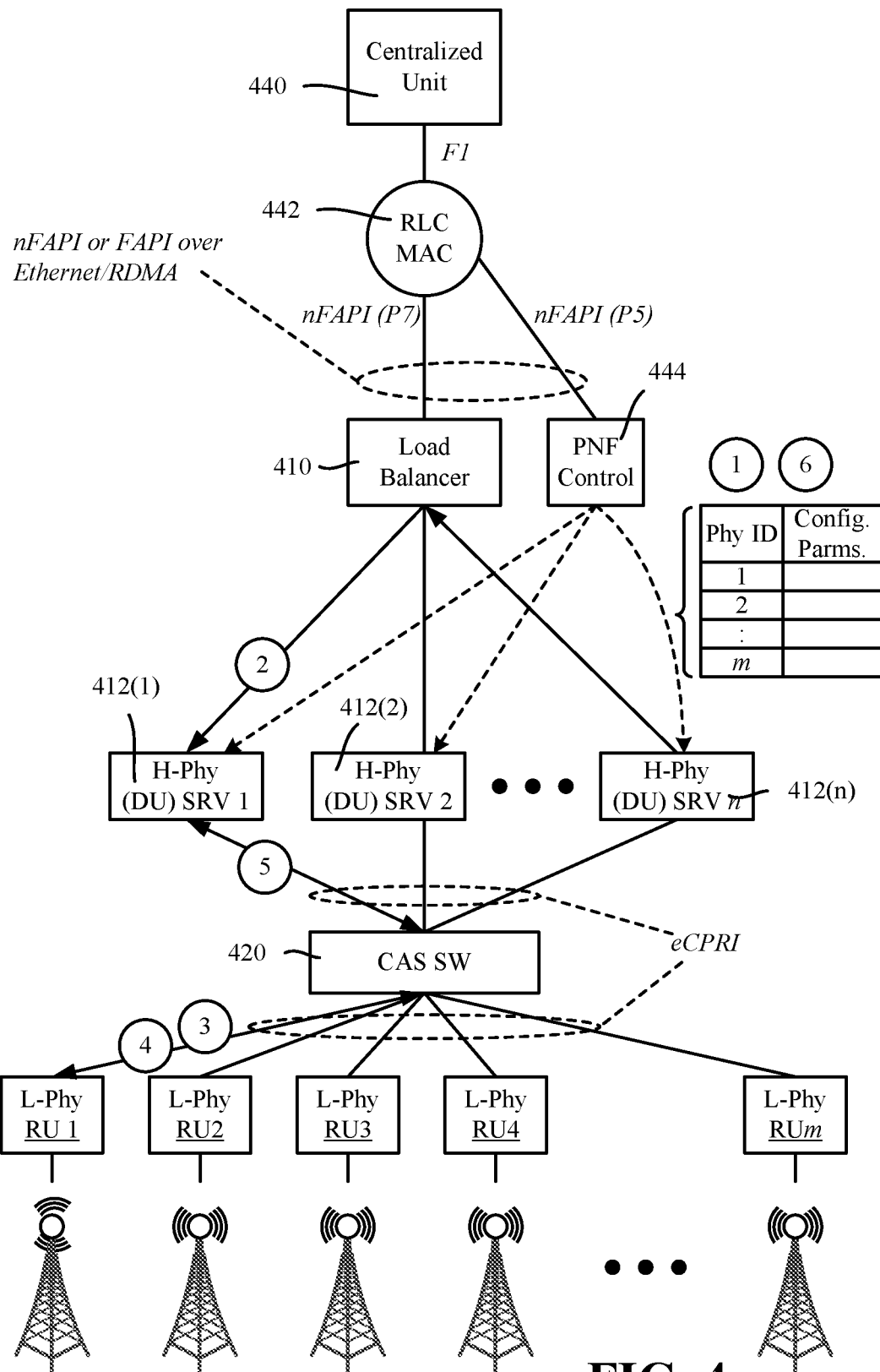
FIG. 4 is an example block diagram and dataflow representation of disaggregated baseband unit load balancing, in accordance with various aspects and embodiments of the subject disclosure.

FIG. 4 shows example components and data flows related to a load balanced system comprising a load balancer 410 as described herein; note that the load balancer 410 can be implemented as part of the MAC (Medium Access Control) layer or a switch (not separately shown in FIG. 4) as described herein.

In FIG. 4, an RLC (Radio Link Control)/MAC layer (L2/3) component 442 (an L2/3 application or the like) is coupled by the F1 interface to a centralized unit 440. The RLC/MAC component 442 configures the High Physical layer units (e.g., distributed unit) 412(1)-412(n) via a PNF (Physical Network Function) control component 444. More particularly, as represented by circled numeral one (1), the PNF control component 444 configures the High-Phy components across the distributed unit compute nodes (SRV1-SRVn labeled 412(1)-412(n)), using the nFAPI P5 (network Functional Application Platform Interface), FAPI (Functional Application Protocol) transported over Ethernet/IP/RDMA or similar protocol and stores configuration information related to each physical layer instance in the structure referenced by the Phy ID. In this way, the distributed units in the pool store the static configuration information of each cell (corresponding to the radio units RU1-RUm). The stored static parameters include, but are not limited to, nCarrierIdx, nDMRSTypeAPos, nPhyCellId, nDLAbsFrePointA, nULAbsFrePointA, nDLBandwidth, radio unit MAC/IP address, and similar data.

As represented by circled numeral two (2), the load balancer 410 (which can be part of MAC, additional layer of software running collocated with MAC or implemented in the switch) distributes slot structure information as well as downlink data across the compute nodes 412(1)-412(n). In one implementation, the load balancer changes the destination (e.g., destination addresses (MAC or IP)) between the MAC layer and the distributed unit layer, so that control messages and corresponding user downlink data are load balanced across the different distributed units. Further, an H-Phy DU that processes data can pass its DU ID value into the eCPRI (enhanced Common Public Radio Interface) header (Rtcid/Pcid field).

As represented by circled numeral three (3), the CAS SW 420 directs eCPRI messages to the appropriate radio unit based on the Ethernet transport header (radio unit's MAC address), which as described above, is known to each distributed unit based on the static configuration via the PNF control 444.

As represented by circled numeral four (4), in the uplink direction the radio unit sets the Rtcid/Pcid value in eCPRI header to equal those received in the slot control packet, and transmits data. In other words, in one alternative implementation, the radio unit returns the DU ID in its transmission so that the same distributed unit that sent the uplink control message will receive the uplink data, and the CAS switch will translate the MAC address based on DU ID back to the MAC address of the correct distributed unit. In another alternative, the radio unit can instead be configured to transmit uplink data to the same MAC from where the slot control packet came, without the need for CAS MAC address translation As represented by circled numeral five (5), the CAS switch 420 forwards uplink data to the correct h-PHY DU node. To this end, address information is obtained via the MAC translation if the CAS does MAC translation based on DU ID as in one alternative described herein; otherwise the address is already present as part of the radio unit's uplink communication, as described herein in another alternative.

As represented by circled numeral six (6), the H-Phy DU server 412(1) uses the Phy ID (DU_Port_ID) to locate appropriate processing parameters, and forwards L2 traffic towards MAC 442.

Figure 5:
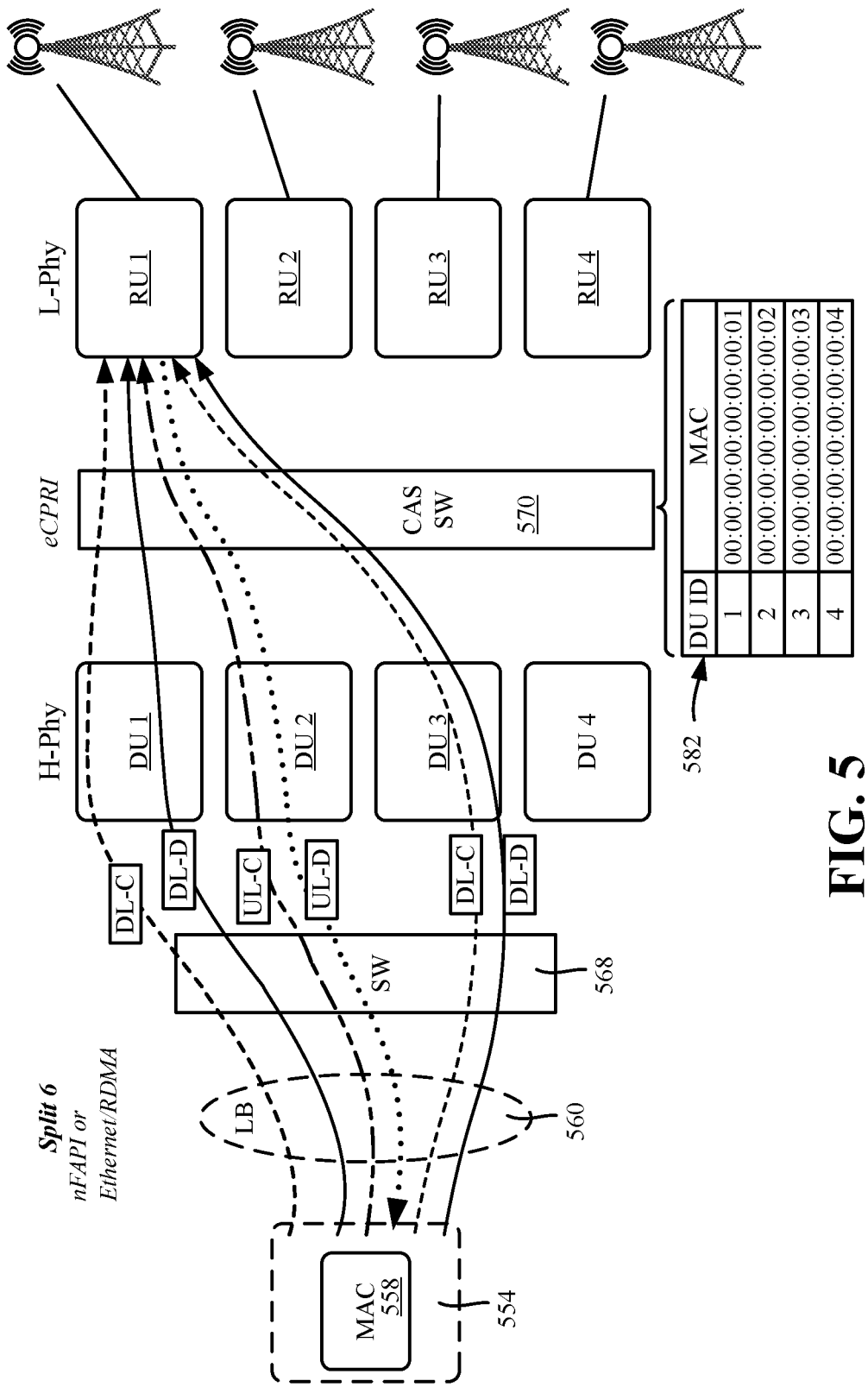
FIG. 5 is an example block diagram and dataflow representation showing load balancing downlink and uplink communications, in accordance with various aspects and embodiments of the subject disclosure.

FIG. 5 illustrates a more specific example in which data is sent to and from a radio unit RU1 through multiple distributed units DU1-DU3. In FIG. 5, the curved, evenly dashed lines labeled "DL-C" shows downlink control data, the curved solid lines labeled "DL-D" shows downlink user data, the curved, intermittently dashed line labeled "UL-C" shows uplink control data, and the curved dotted line labeled "UL-D" shows uplink user data.

Note that load balancing can be performed per carrier, per subcarrier, per user equipment, per transmission time interval (TTI or slot), per bearer, or per channel. The load balancer can be configured for one or more load balancing options, or can select among various options based on the traffic being load balanced. Further, non-liming examples of types of load balancing can be round robin, based on least distributed unit load utilization (e.g., the load balancer can monitor DU loads), based on relative weights among the DUs, and so forth.

Consider that in the example of FIG. 5, a relatively large document is to be sent to a single user equipment (not explicitly shown in FIG. 5) coupled to RU 1. Transmission of a large document needs relatively many (e.g., in this example on the order of millions of) TTIs/slots, and that per-slot load balancing is selected or is in use by the load balancer for this particular data traffic. As is understood, the higher/MAC layer 554/558 splits the large document into small physical blocks corresponding to small transmissions per TTI slot, with the size depending on MAC parameters (e.g., a TTI can be from 1 millisecond to ⅛ millisecond (125 microseconds)).

Figure 3A:
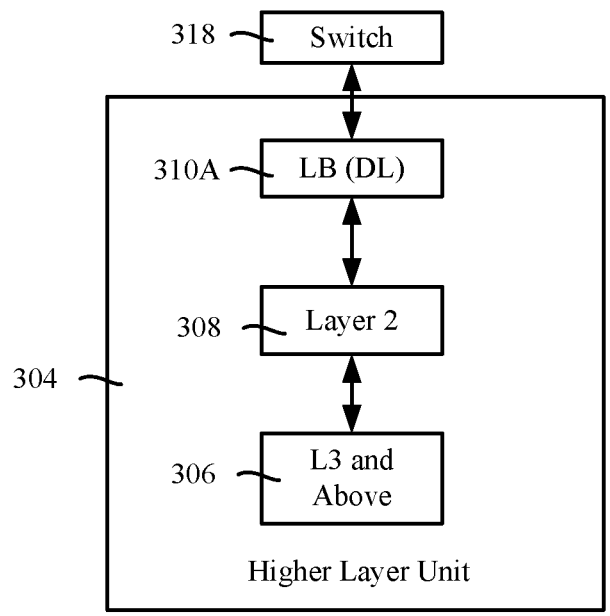
FIGS. 3A-3C show examples of alternative ways in which a load balancer can be implemented, in accordance with various aspects and embodiments of the subject disclosure.
Figure 3B:
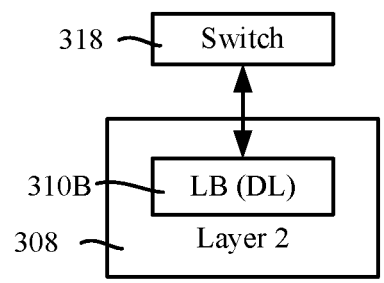
Figure 3C:
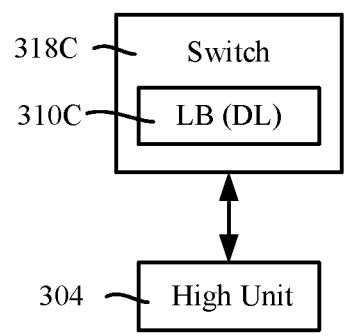

A load balancer 560 is shown in FIG. 5, which as described herein, can be an independent component as in FIGS. 1 and 2, alternatively can be incorporated into the higher layer 554 (which can be at the MAC layer 558) such as in FIGS. 3A and 3B, or incorporated into a switch 568 as in FIG. 3C.

In this example, for each slot, the load balancer 560 load balances across multiple distributed units, such as to download part of the transmissions over DU 1 and part of the transmissions over DU 3, e.g., alternating between the distributed units (e.g., slot 1 via DU 1, slot 2 via DU 3, slot 3 via DU 1, slot 4 via DU 3, and so on). Thus, the two dashed DU-D lines can be to the same user equipment via a single radio unit RU 1, that is, a stream of data for the one document basically can be sent half via DU 1, and half via DU 3.

As described herein, to load balance downlink communications, the load balancer 560, which operates between the higher layer(s) and the distributed unit L1 H-Phy layer, load balances the control messages and user data by changing the destinations to one of the DU 1 and DU 3 distributed units in this example. Note that the downlink data corresponding to a downlink control message goes through the same distributed unit as the control message, e.g., a first downlink control message that references a first piece of downlink user data both go to DU 1, a second downlink control message that references a second piece of downlink user data both go to DU 3, a third downlink control message that references a third piece of downlink user data both go to DU 1, and so on in this example.

As described with reference to FIG. 4, the distributed units DU 1 and DU 3 are configured with the single address to send to, that is, the destination (for user 1) address is radio unit RU 1. The CAS switch 570 simply sends the data to this address, RU 1.

With respect to uplink communications (UL-C and UL-D), the uplink control message (load balanced so as to be sent via DU 2 in this example) generally works in the same way as the downlink control messages, however the uplink data needs to be sent to the same DU (DU 2) used for the uplink control message. As set forth above, this can be done in alternative ways.

A first alternative is to have the CAS switch 570 be programmed with/maintain a DU ID to MAC address translation data structure (table) 582. The distributed unit (DU 2 in this example) puts the DU-ID in the control message (e.g., the DU ID is written into an appropriate field in the message header according to the eCPRI protocol).

In one alternative, the radio unit RU 1 only needs to have the same DU ID obtained in the uplink control message associated with its uplink data transmission. The CAS switch 570 uses the table 582 to perform DU-ID to MAC translation, and the uplink data is sent to the correct distributed unit (DU 2) corresponding to the control message. An advantage of this alternative is that the radio units need not be changed with respect to how uplink communications are currently sent.

In another alternative, the radio unit RU 1 maintains the MAC address of the distributed unit from where the uplink control message was received. The uplink data transmission is sent back to this MAC address, that is, to the same DU from where the control message was received, DU 2 in this example. An advantage of this alternative is that MAC address translation by the CAS switch is not needed; however the radio units need to be modified from their current specification to operate in this manner.

Figure 6:
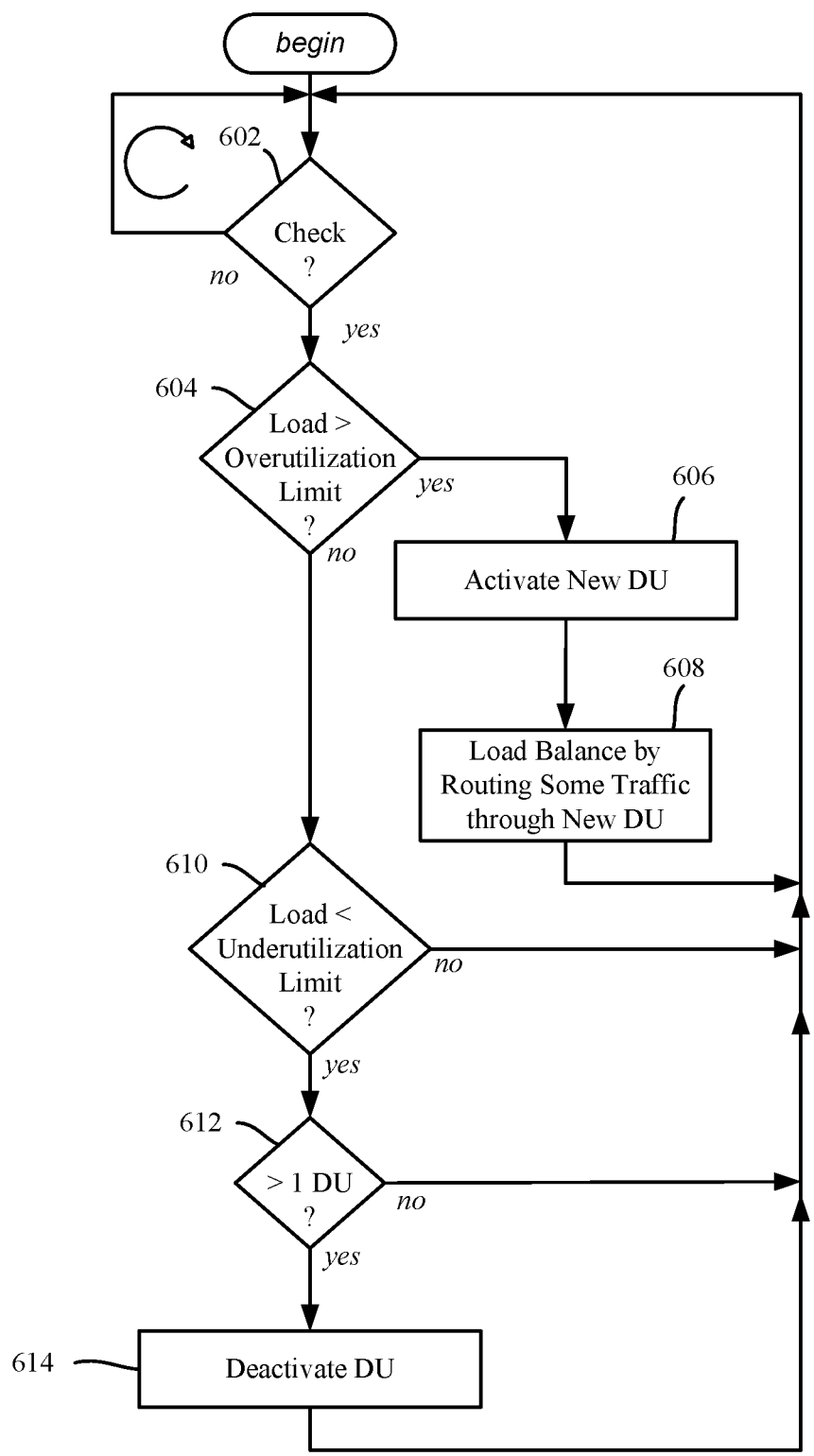
FIG. 6 is a flow diagram representing example operations of a load balancer to adjust the number of active distributed units based on current demand, in accordance with various aspects and embodiments of the subject disclosure.

FIG. 6 is a flow diagram of example operations of a load balancer with respect to increasing or decreasing the amount of active distributed units, or leaving the current number unchanged. Operation 602 represents waiting for a duration and/or event (such as the current distributed units becoming overutilized with respect to some overutilization criterion or underutilized with respect to satisfying some underutilization criterion. This can, for example, be an overutilization threshold value and underutilization threshold value, respectively, although it is feasible to have a single threshold value that decides both overutilization and underutilization states. Note that the operations following operation 602 can be triggered based on time instead of or in addition to event-based triggering.

Operation 604 represents evaluating the load utilization of the distributed unit or units with respect to an overutilization criterion (e.g., a threshold or other limit). If over the limit, operation 606 activates a new distributed unit, and operation 608 starts routing traffic (control messages and data) through the newly activated distributed unit. For example, if the average distributed unit(s) are loaded to ninety percent, activate a new one. The example process returns to operation 602 until a subsequent evaluation is to be performed; note that there can be some delay so that the load balancer gives some time for the newly activated distributed unit to reduce the load on the other distributed units before activating yet another distributed unit, and so on. It is also feasible for the load balancer to recognize a very heavy overutilization state and thus the need to activate more than one new distributed unit at operation 606.

Returning to operation 604, if not overutilized in this example, operation 610 is performed to evaluate whether the distributed unit(s) are underutilized; if not, the example process returns to operation 602 until the subsequent evaluation is to occur. As set forth herein, a different criterion (e.g., is below a threshold load or the like that satisfies an underutilization criterion) can be used for underutilization, so that activation and deactivation tend to be gradual rather than very frequent events. Consider that in the above example, if the average distributed unit(s) are loaded to ninety percent, activate a new one, but do not deactivate a distributed unit until the average load utilization is below forty percent.

Further, before deactivating, in this example at least one distributed unit is to remain active. To this end, operation 612 prevents deactivation if there is only one active distributed unit so that the one distributed unit remains active. Otherwise, operation 614 deactivates a distributed unit.

Figure 7:
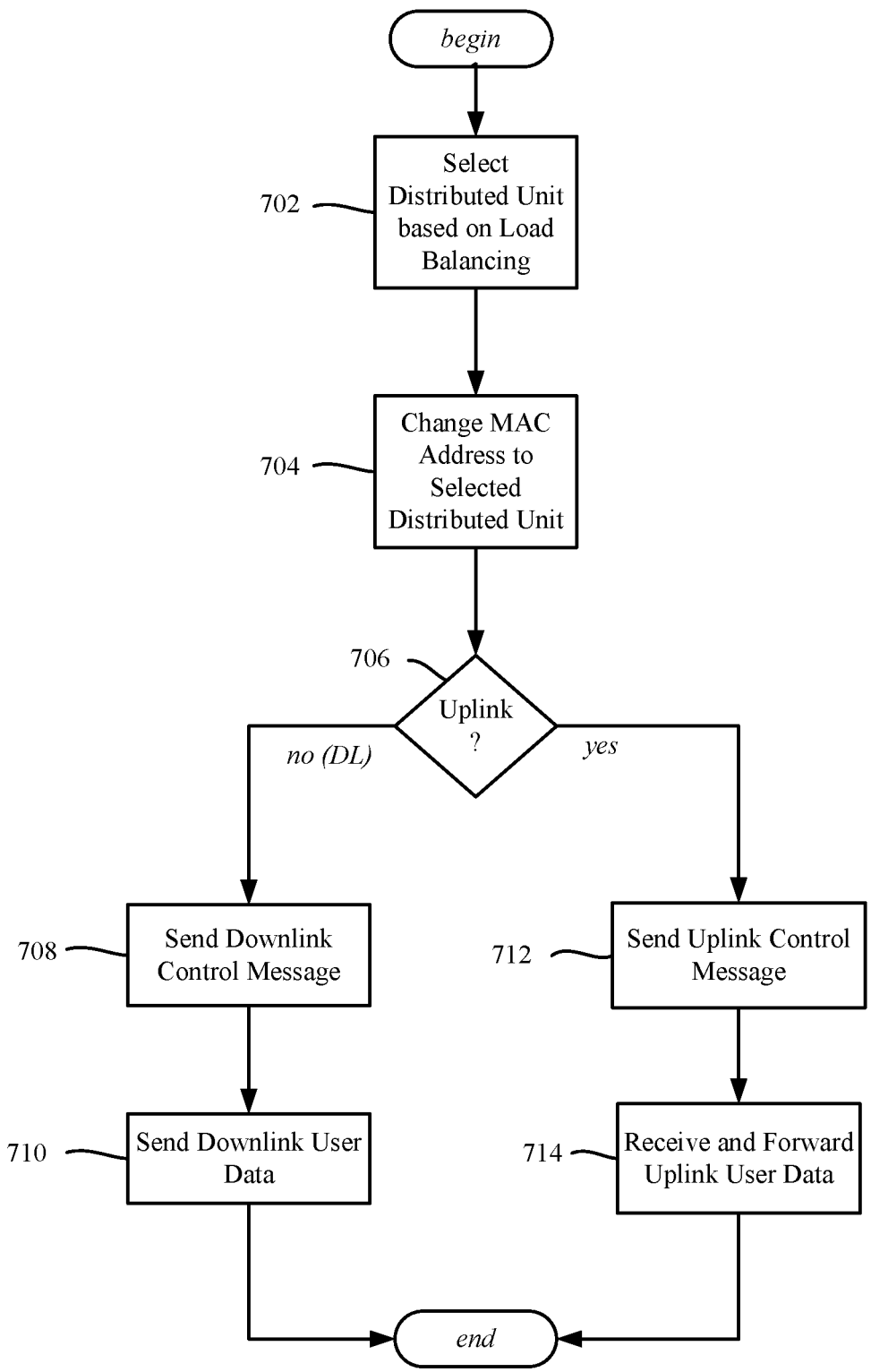
FIG. 7 is a flow diagram representing example operations of a load balancer to handle uplink and downlink communications, in accordance with various aspects and embodiments of the subject disclosure.

FIG. 7 is a flow diagram of example operations of a load balancer with respect to handling uplink and downlink communications. Note that uplink and downlink can be handled by separate processes, however the general logic of FIG. 7 summarizes example operations.

Operation 702 represents selecting a distributed unit based on load balancing, e.g., round robin, the least utilized distributed unit and so on. In the event there is only one distributed unit, selection is automatically to that distributed unit.

Operation 704 changes the MAC or IP address so that the switch will direct the control message and user data to the selected distributed unit; (note that eCPRI optionally can communicate using IP over Ethernet protocol). As set forth herein, the load balancer can be incorporated into the switch. In any event, the selected distributed unit gets the communication.

Operation 706 evaluates whether the control message is for an uplink or downlink communication. If downlink, operation 708 sends the downlink control message to the selected distributed unit, which then reaches the radio unit serving the user equipment as described herein. Operation 710 represents sending the downlink user data (after any acknowledgment/control message retransmission as needed, or the like).

If the message is an uplink control message, operation 712 sends the uplink control message to the selected distributed unit, which then reaches the radio unit serving the user equipment as described herein. Operation 714 represents receiving the uplink user data (after any acknowledgment/control message retransmission as needed, or the like) from the selected distributed unit.

Figure 8:
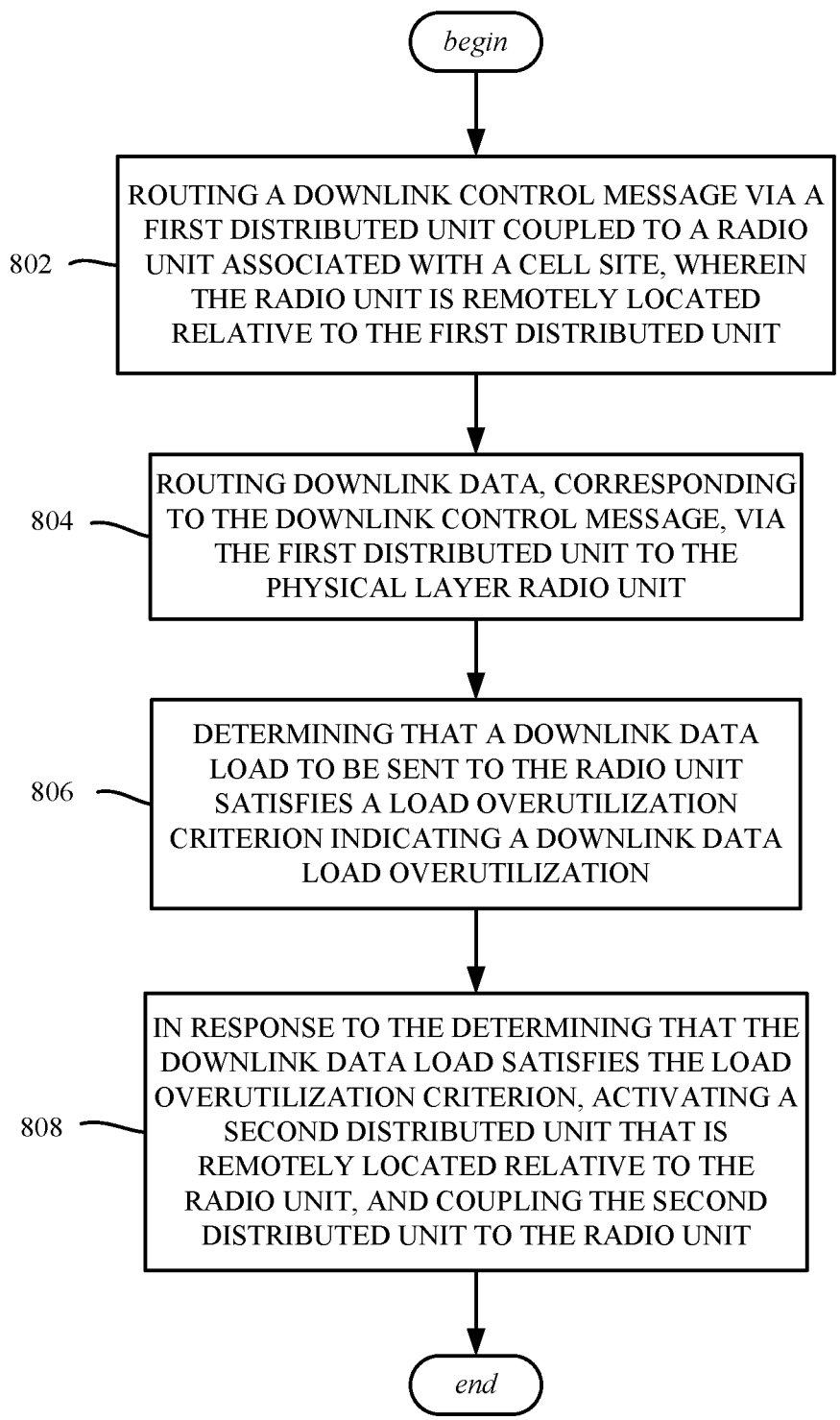
FIG. 8 illustrates example operations of a load balancer that handles first downlink communications via a first distributed unit, and activates a second distributed unit for handling second downlink data when a current data load satisfies a load overutilization criterion, in accordance with various aspects and embodiments of the subject disclosure.

One or more example aspects are represented in FIG. 8, and can correspond to a system, comprising a processor, and a memory that stores executable instructions that, when executed by the processor of the system, facilitate performance of operations. Example operation 802 represents routing a downlink control message via a first distributed unit coupled to a radio unit associated with a cell site, wherein the radio unit is remotely located relative to the first distributed unit. Example operation 804 represents routing downlink data, corresponding to the downlink control message, via the first distributed unit to the physical layer radio unit. Example operation 806 represents determining that a downlink data load to be sent to the radio unit satisfies a load overutilization criterion indicating a downlink data load overutilization. Example operation 808 represents, in response to the determining that the downlink data load satisfies the load overutilization criterion, activating a second distributed unit that is remotely located relative to the radio unit, and coupling the second distributed unit to the radio unit.

The downlink control message can be a first downlink control message, the downlink data can be first downlink data, and further operations can comprise routing a second downlink control message via the second distributed unit to the radio unit, and routing second downlink data corresponding to the second downlink control message via the second distributed unit to the physical layer radio unit to load balance the downlink data load to the radio unit between the first distributed unit and the second distributed unit.

Further operations can comprise activating a third distributed unit that is remotely located relative to the radio unit, coupling the third distributed unit to the radio unit, routing an uplink control message via the third distributed unit to the radio unit, and routing uplink data from the physical layer radio unit via the third distributed unit to an uplink data consumer device.

Coupling the third distributed unit to the radio unit can comprise coupling the third distributed unit to the radio unit via a switch; the uplink control message can contain an identifier of the third distributed unit, the switch can maintain a mapping of the identifier of the third distributed unit to a media access control address of the third distributed unit, and routing the uplink data from the physical layer radio unit via the third distributed unit can comprise accessing the mapping at the switch to determine the media access control address of the third distributed unit.

The uplink control message can be associated with a media access control address or internet protocol (IP) address of the third distributed unit, and routing the uplink data from the physical layer radio unit via the third distributed unit to the uplink data consumer can comprise sending the uplink data to the third distributed unit based on the media access control address or IP address associated with the uplink control message.

The first distributed unit and the second distributed unit can be part of a pool of centralized distributed units. The first distributed unit and the second distributed can comprise software-defined network functions.

Further operations can comprise determining that the downlink data load to be sent to the radio unit satisfies a load underutilization criterion indicating a downlink data load underutilization, and in response to the determining that the downlink data load satisfies the load underutilization criterion, deactivating the second distributed unit.

Determining that the downlink data load to be sent to the radio unit satisfies the load overutilization criterion can comprise evaluating the load overutilization criterion at a load balancer that activates the first distributed unit and activates the second distributed unit.

The load balancer can be incorporated into a media access layer component coupled to the first distributed unit and the second distributed unit via a switch. The load balancer can be incorporated into a switch that couples a media access layer component to the first distributed unit and to the second distributed unit.

The load balancer can perform the evaluating of the load overutilization criterion based on at least one of: per carrier load balancing, per subcarrier load balancing, per user equipment load balancing, per transmission time interval load balancing, per bearer load balancing, or per channel load balancing, per frame load balancing, per subframe load balancing, or per slot load balancing.

Figure 9:
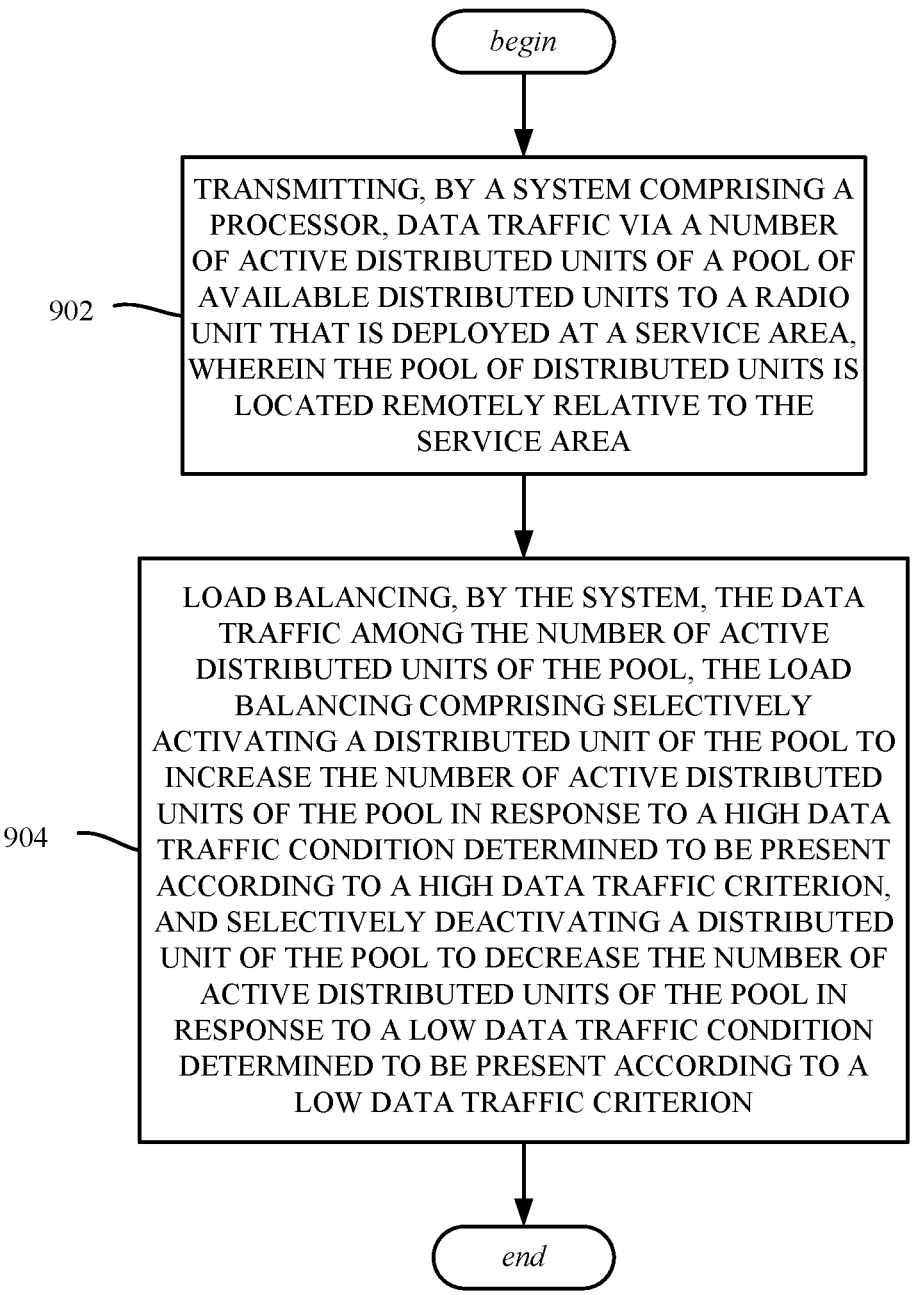
FIG. 9 illustrates example load balancing operations to balance data traffic among a number of active distributed units of a pool of distributed units, including to increase the number of active distributed units in response to a high data traffic condition and selectively deactivating/decreasing the number of active distributed units of the pool in response to a low data traffic condition, in accordance with various aspects and embodiments of the subject disclosure.
Figure 10:
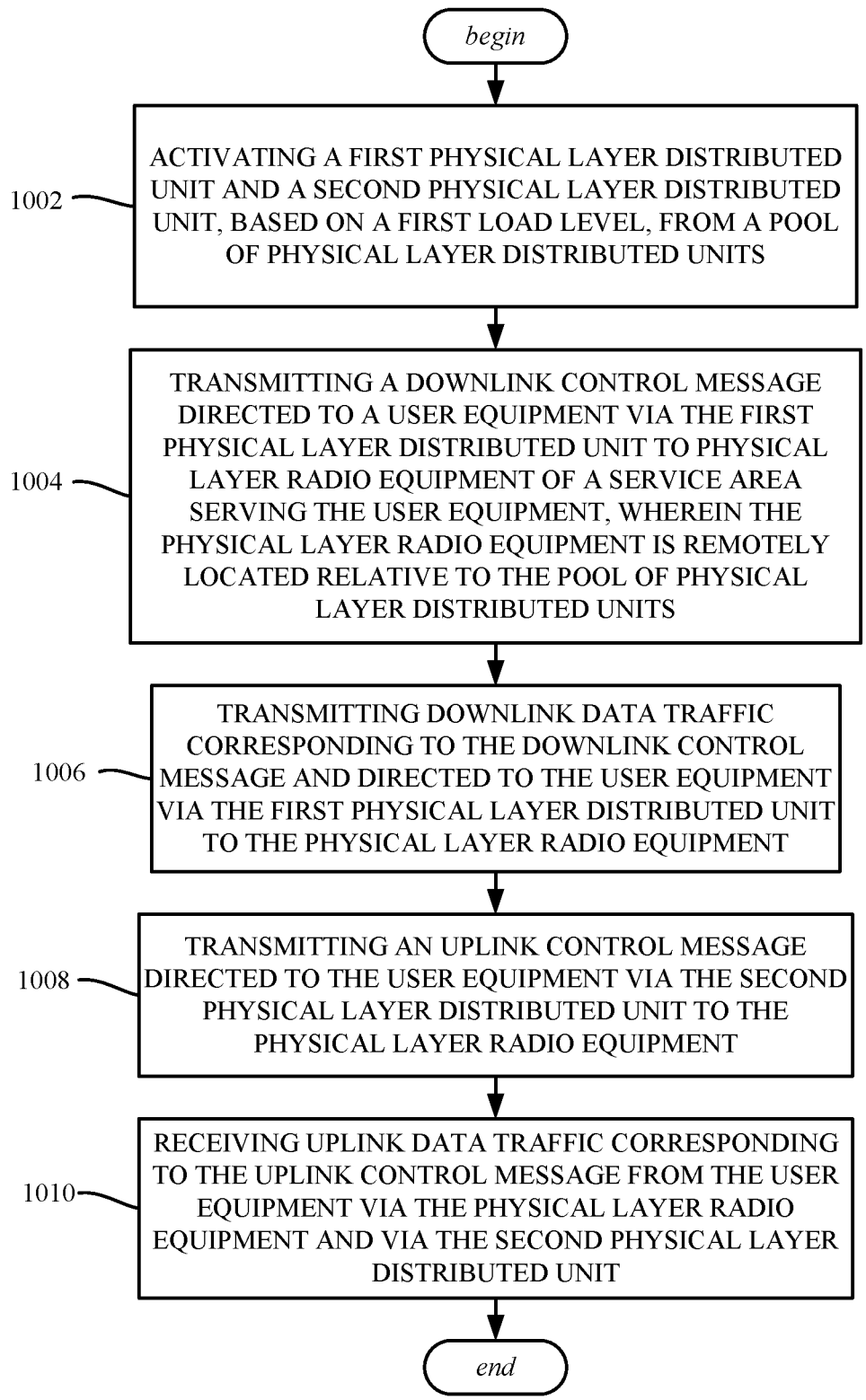
FIG. 10 illustrates example operations related to activating distributed units from a pool of distributed units to handle uplink and downlink communications, in accordance with various aspects and embodiments of the subject disclosure.

One or more example aspects are represented in FIG. 9, and can correspond to example operations of a method. Operation 902 represents transmitting, by a system comprising a processor, data traffic via a number of active distributed units of a pool of available distributed units to a radio unit that is deployed at a service area, wherein the pool of distributed units is located remotely relative to the service area. Operation 904 represents load balancing, by the system, the data traffic among the number of active distributed units of the pool, the load balancing comprising selectively activating a distributed unit of the pool to increase the number of active distributed units of the pool in response to a high data traffic condition determined to be present according to a high data traffic criterion, and selectively deactivating a distributed unit of the pool to decrease the number of active distributed units of the pool in response to a low data traffic condition determined to be present according to a low data traffic criterion.

Transmitting the downlink data traffic can comprise inserting a distributed unit identifier into a header associated with a data transmission for routing the data transmission via an active distributed unit identified by the distributed unit identifier.

Aspects can comprise transmitting, by the system, an uplink control message via a selected active distributed unit to the radio unit, and transmitting, by the system, uplink data traffic corresponding to the uplink control message from the radio unit via the selected active distributed unit.

The radio unit can transmit the uplink data traffic to the selected active distributed unit based on a media access control address of the selected active distributed unit associated with the uplink control message.

The radio unit can transmit the uplink data traffic to the selected active distributed unit based on associating the uplink data traffic with a distributed unit identifier of the selected active distributed unit, and sending the uplink data traffic to a switch that maps the distributed unit identifier to a media access control address of the selected active distributed unit.

The radio unit can be a first radio unit deployed at a first service area; aspects can comprise transmitting, by the system, the downlink data traffic from the number of active distributed units to a second radio unit that is deployed at a second service area.

Figure 12:
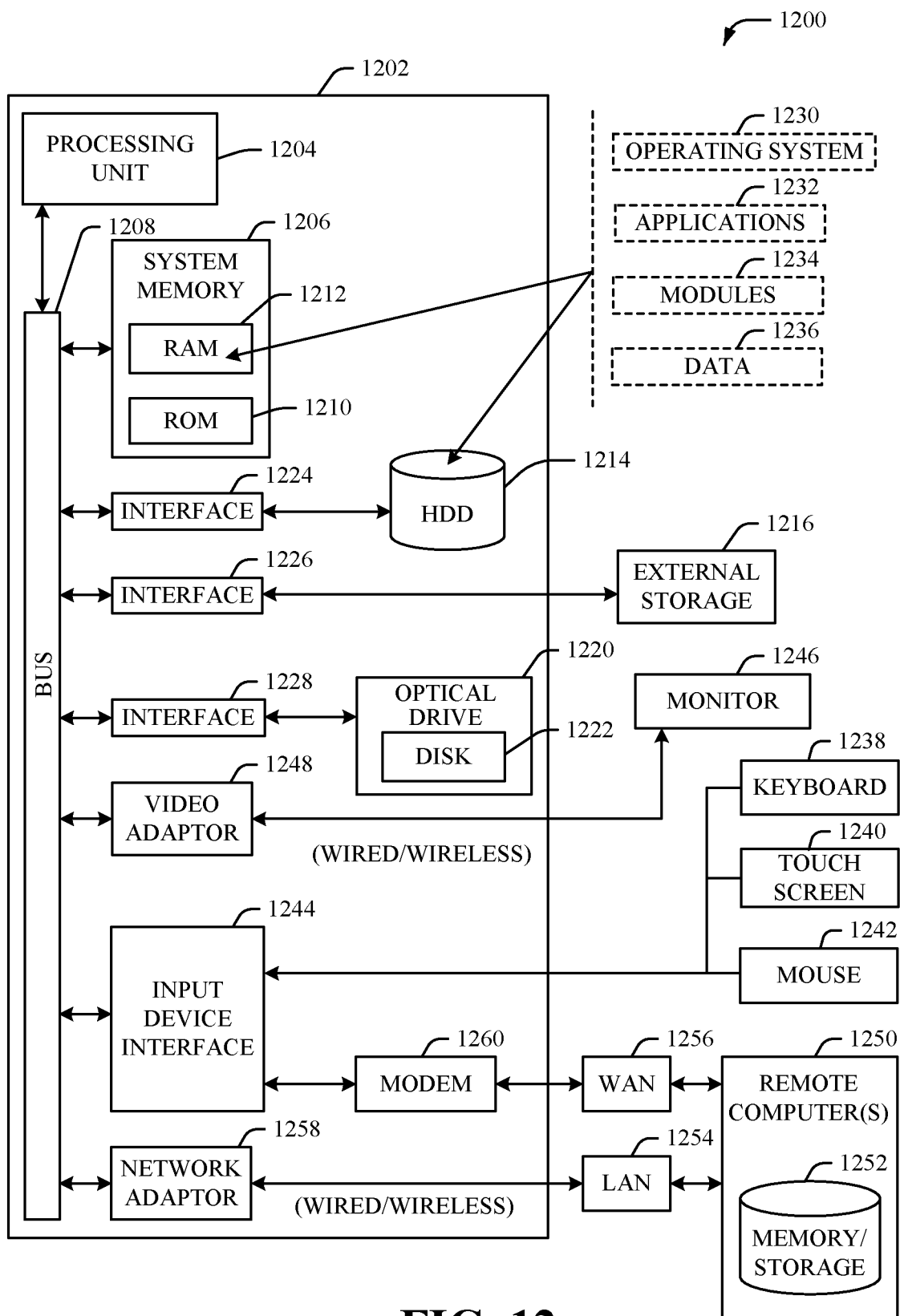
FIG. 12 illustrates an example block diagram of an example computer/machine system operable to engage in a system architecture that facilitates wireless communications according to one or more embodiments described herein.

One or more aspects are represented in FIG. 12, such as implemented in a machine-readable medium, comprising executable instructions that, when executed by a processor, facilitate performance of operations. Example operation 1202 represents activating a first physical layer distributed unit and a second physical layer distributed unit, based on a first load level, from a pool of physical layer distributed units. Example operation 1204 represents transmitting a downlink control message directed to a user equipment via the first physical layer distributed unit to physical layer radio equipment of a service area serving the user equipment, wherein the physical layer radio equipment is remotely located relative to the pool of physical layer distributed units. Example operation 1206 represents transmitting downlink data traffic corresponding to the downlink control message and directed to the user equipment via the first physical layer distributed unit to the physical layer radio equipment. Example operation 1208 represents transmitting an uplink control message directed to the user equipment via the second physical layer distributed unit to the physical layer radio equipment. Example operation 1210 represents receiving uplink data traffic corresponding to the uplink control message from the user equipment via the physical layer radio equipment and via the second physical layer distributed unit.

The first load level can decrease to a second load level, and further operations can comprise, based on the second load level, deactivating the second physical layer distributed unit.

As can be seen, the technology described herein provides a cost-effective way to deploy load-balanced baseband units for 5G services and beyond. This facilitates cost saving for an initial service deployment by adjusting to meet the actual, current demand of the network service as demand changes over time rather than overprovisioning in anticipation of possible demand. Moreover, the technology contributes to the reduction of the operational costs, such as energy cost, by appropriately scaling the network capability.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 11:
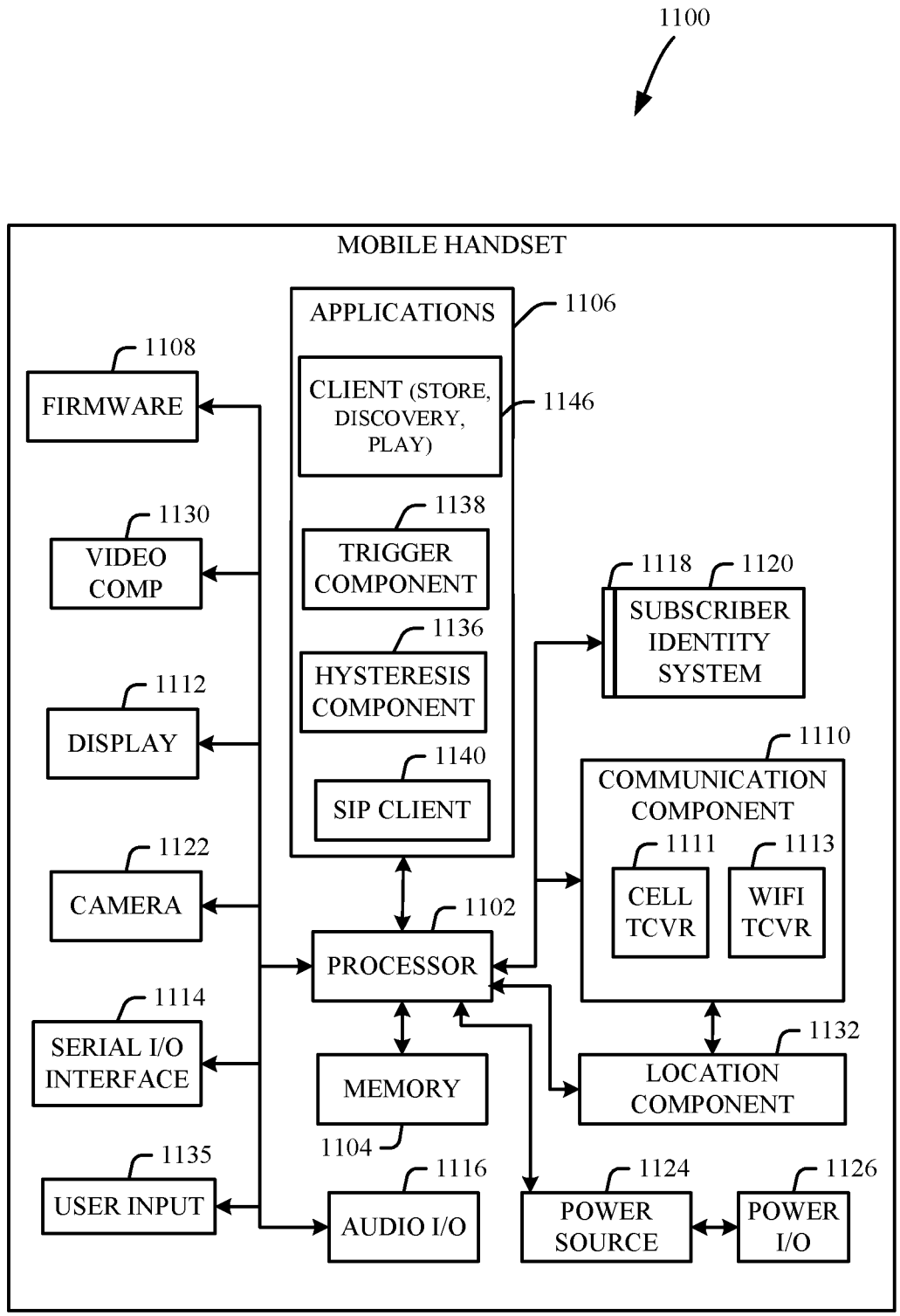
FIG. 11 illustrates an example block diagram of an example mobile handset operable to engage in a system architecture that facilitates wireless communications according to one or more embodiments described herein.

Referring now to FIG. 11, illustrated is a schematic block diagram of an example end-user device (such as a user equipment) that can be a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1194) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD), non-volatile memory and other storage technology could be used in addition to, or in place of, an HDD 1214, and can be internal or external. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally include emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can include one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1194 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 12 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions which, when executed by the processor of the system, facilitate performance of operations, the operations comprising:
   creating a first software-defined network function forming a first distributed unit coupled to a physical layer radio unit associated with a cell site, the physical layer radio unit being one physical layer radio unit of a pool of physical layer radio units;
   determining that a downlink data load to be sent to the physical layer radio unit associated with the cell site satisfies a defined load overutilization criterion indicative of a downlink data load overutilization of the first distributed unit coupled to the physical layer radio unit, wherein the physical layer radio unit is remotely located relative to the first distributed unit; and
   in response to determining that the downlink data load satisfies the defined load overutilization criterion, creating a second software-defined network function forming a second distributed unit that is remotely located relative to the physical layer radio unit, and coupling the second distributed unit to the physical layer radio unit to manage a changing downlink data load overutilization over time.

2. The system of claim 1, wherein the operations further comprise:
   creating a third distributed unit that is remotely located relative to the physical layer radio unit; and
   activating the third distributed unit and coupling the third distributed unit to the physical layer radio unit.

3. The system of claim 2, wherein the operations further comprise:
   routing an uplink control message via the third distributed unit to the physical layer radio unit; and
   routing uplink data from the physical layer radio unit via the third distributed unit to an uplink data consumer device.

4. The system of claim 3, wherein coupling the third distributed unit to the physical layer radio unit comprises coupling the third distributed unit to the physical layer radio unit via a switch,
   wherein the uplink control message comprises an identifier of the third distributed unit,
   wherein the switch maintains a mapping of the identifier of the third distributed unit to a media access control address of the third distributed unit, and
   wherein routing the uplink data from the physical layer radio unit via the third distributed unit comprises accessing the mapping at the switch to determine the media access control address of the third distributed unit.

5. The system of claim 3, wherein the uplink control message is associated with a media access control address of the third distributed unit or an internet protocol address of the third distributed unit, and
   wherein routing the uplink data from the physical layer radio unit via the third distributed unit to the uplink data consumer device comprises sending the uplink data to the third distributed unit based on the media access control address or the internet protocol address.

6. The system of claim 1, wherein a pool of centralized distributed units comprises the first distributed unit and the second distributed unit.

7. The system of claim 1, wherein the first distributed unit and the second distributed unit comprise software-defined network functions selectively created by the system in response to the changing downlink data load overutilization over time.

8. The system of claim 1, wherein the operations further comprise:
   in response to a determination that the downlink data load to be sent to the physical layer radio unit satisfies defined a load underutilization criterion indicative of a downlink data load underutilization, deactivating the second distributed unit.

9. The system of claim 1, wherein the determining that the downlink data load to be sent to the physical layer radio unit satisfies the defined load overutilization criterion comprises evaluating the defined load overutilization criterion at a load balancer that creates and activates the first distributed unit and creates and activates the second distributed unit.

10. The system of claim 9, wherein a media access layer component comprises the load balancer, and wherein the media access layer component is coupled to the first distributed unit and the second distributed unit via a switch.

11. The system of claim 9, wherein the system further comprises a switch, the switch including the load balancer, and wherein the switch couples a media access layer component to the first distributed unit and to the second distributed unit.

12. The system of claim 9, wherein evaluating the defined load overutilization criterion is based on at least one of: per carrier load balancing, per subcarrier load balancing, per user equipment load balancing, per transmission time interval load balancing, per bearer load balancing, or per channel load balancing, per frame load balancing, per subframe load balancing,
or per slot load balancing.

13. A method, comprising:
transmitting, by a system comprising a processor, data traffic via active distributed units, of a pool of available distributed units, to a radio unit deployed at a service area, wherein the pool of available distributed units is remotely located relative to the service area; and
facilitating, by the system, load balancing of the data traffic among the active distributed units of the pool of available distributed units, wherein the load balancing comprises creating one or more software-defined network functions in response to a changing traffic demand over time, wherein a respective software-defined network function forms a respective additional distributed unit to add to the pool of available distributed units to manage the changing traffic demand over time, wherein the respective software-defined network function is located remotely from the radio unit deployed at a service area.

14. The method of claim 13, wherein the load balancing comprises selectively activating a distributed unit of the pool of available distributed units to increase a quantity of the active distributed units, of the pool of available distributed units, in response to a determination, according to a defined high data traffic criterion, of existence of a high data traffic condition.

15. The method of claim 13, wherein the load balancing comprises selectively deactivating a distributed unit of the pool of available distributed units to decrease a quantity of the active distributed units, of the pool of available distributed units, in response to a determination, according to a defined low data traffic criterion, of existence of a low data traffic condition.

16. The method of claim 13, wherein transmitting the data traffic comprises inserting a distributed unit identifier into a header associated with a data transmission for a routing of the data transmission via an active distributed unit identified via the distributed unit identifier.

17. The method of claim 13, further comprising:
transmitting, by the system, to the radio unit, an uplink control message via a selected active distributed unit; and
transmitting, by the system, uplink data traffic corresponding to the uplink control message from the radio unit via the selected active distributed unit.

18. The method of claim 13, wherein the radio unit comprises a first radio unit deployed at a first service area, and wherein the method further comprises:
transmitting, by the system, the data traffic from the active distributed units to a second radio unit deployed at a second service area.

19. A non-transitory machine-readable medium, comprising executable instructions that, when executed by a processor, facilitate performance of operations, comprising:
based on a determined traffic load level of downlink data traffic in a network, creating a first software-defined network function as a first physical layer distributed unit of a pool of physical layer distributed units and creating a second software-defined network function as a second physical layer distributed unit of the pool of physical layer distributed units, wherein the creating the first software-defined network function and the second software-defined network function is responsive to the determined traffic load level;
transmitting downlink data traffic, corresponding to a downlink control message and directed to a user equipment, via the first physical layer distributed unit to physical layer radio equipment serving the user equipment, wherein the physical layer radio equipment is remotely located relative to the pool of physical layer distributed units; and
accepting uplink data traffic, corresponding to an uplink control message, from the user equipment via the physical layer radio equipment and via the second physical layer distributed unit.

20. The non-transitory machine-readable medium of claim 19, wherein the determined traffic load level of downlink data traffic is determined to decrease to a second traffic load level, below a defined threshold level, and wherein the operations further comprise:
based on the second traffic load level, deactivating the second physical layer distributed unit.

* * * * *